United States Patent [19]

Cambier

[11] 4,377,842
[45] Mar. 22, 1983

[54] FLYBACK VOLTAGE CONTROL

[75] Inventor: Craig S. Cambier, Boulder, Colo.

[73] Assignee: International Business Machines Corporation, Armonk, N.Y.

[21] Appl. No.: 194,191

[22] Filed: Oct. 6, 1980

[51] Int. Cl.³ .......................................... H02M 3/335
[52] U.S. Cl. .......................................... 363/20; 363/39
[58] Field of Search .................................. 363/18–21, 363/39–40, 55–56, 124, 131; 307/540, 542, 543, 549; 323/282, 285

[56] References Cited

U.S. PATENT DOCUMENTS

| | | | |
|---|---|---|---|
| 3,025,412 | 3/1962 | Felker | 331/112 X |
| 3,654,488 | 4/1972 | Traub et al. | 307/543 |
| 3,660,682 | 5/1972 | Gartner | 307/557 |
| 4,016,482 | 4/1977 | Cielo et al. | 323/17 |
| 4,031,453 | 6/1977 | Teuling | 363/20 |
| 4,275,436 | 6/1981 | Peterson | 363/126 X |

OTHER PUBLICATIONS

IBM Technical Disclosure Bulletin, vol. 21, No. 12, May 1979, pp. 4909–4910; H. S. Hoffman, Jr. "Multiple Regulator Controls Using Diversion Switches".

*Primary Examiner*—William M. Shoop
*Assistant Examiner*—Peter S. Wong

[57] ABSTRACT

Flyback power supply with secondary circuit damping during primary charging. This reduces the induced or reflected oscillations into the primary circuit and superimposition onto the primary current so that the latter becomes a monotonically increasing function, permitting and facilitating feedback control.

7 Claims, 13 Drawing Figures

FLYBACK VOLTAGE CONTROL

DESCRIPTION

TECHNICAL FIELD

This invention relates to high voltage power supplies and particularly, to high voltage power supplies of the flyback type.

Flyback power supplies for generating high voltages at light loads are simple and economical. A simple high voltage flyback power supply is used in the ignition circuit of gasoline engines to produce the high voltage required for efficient spark plug operation. A low-voltage, high-current primary source (battery) connected across the primary circuit causes a magnetic field to be built up around the transformer (coil). In gasoline engines, the dwell time is measured in degrees of rotation of the distributor shaft which rotates at half the angular velocity of the main shaft. This measurement indicates the portion of the engine's rotation during which the points are closed, allowing current to flow through the primary. Sufficient time to build up a strong field is required.

When the field is allowed to collapse rapidly, such as by opening the distributor points in the automobile ignition circuit, a high voltage is generated in the secondary windings by the collapsing lines of magnetic force. Thus, a 6-volt input from a battery can produce a 36-kilovolt output voltage. As the automobile engine speeds up, the actual dwell time decreases so that the field is not as strong when the points open as it is at low speeds. Therefore, there is a high voltage decrease at high speeds which causes "misses", i.e., failure of a spark plug to ignite the gasoline-air mixture in a cylinder.

In applications such as copier coronas or precision oscilloscopes, it is necessary to regulate the high voltage. One method of regulation is to vary the input current.

Because of stray (parasitic) capacitances, sinusoids are created by resonance in the secondary circuit and are reflected into the primary circuit. The primary current is, therefore, a ramp with a superimposed sinusoid. Although useful for noise immunity in triggering circuits, the superimposed sinusoids causes the primary current to be nonmonotonically increasing. This creates a problem when feedback regulation is used to control the primary current.

BACKGROUND ART

A flyback power supply having as its main purpose the generation of a regulated high voltage should be distinguished from the flyback power supply used in television horizontal deflection circuits. The latter is primarily used to generate in its primary circuit a suitable waveform that will cause a linear sweep of the electron stream across the face of the television's cathode ray tube (kinescope).

Television display tubes use magnetic deflection vice voltage deflection. This eliminates the need for deflection plates inside the kinescope and permits external sweep (deflection) control. The deflection of the electron stream is at right angles to the magnetic field so that the horizontal deflection coil is mounted vertically over the neck of the kinescope forward of the electron gun. A particular waveshape is required to deflect the electron beam linearly, namely, a trapezoidal waveshape with an initial pulse superimposed on its leading edge. This produces a linear current through the horizontal deflection coils, which exhibit a complex impedance to the driving signal. The initial pulse on the leading edge of the trapezoidal waveshape is created by the resonant ringing of the flyback transformer primary, the negative cycle of the sinusoid being cut off by the action of the damper. The energy in the negative cycle is stored in a capacitor and returned to the circuit later in the sweep cycle. Thus, the leading part of the raster scan is controlled by the horizontal output tube and the other part, by the damper tube action. The use of the rapid return sweep, the flyback, to generate the high voltage for the kinescope is a secondary function of the flyback circuit.

In a flyback power supply, the voltage is controlled in many ways. The primary input voltage can be regulated, but this requires a series-pass device which must carry the full charge current and dissipates heat representing a loss of energy efficiency. Shunt regulators across the high voltage output, such as used in color television circuits to keep the kinescope voltage below 25 kilovolts (to prevent x-radiation) also results in the loss of energy efficiency, generating heat and requiring additional expensive devices that can operate at high voltages.

A feedback regulation circuit for controlling the switch in the flyback primary circuit is shown in U.S. Pat. No. 4,016,482—assigned to the same assignee as the present application. The operation of the feedback connection is, however, not explained in detail but is well known in the art.

Another reference, MULTIPLE REGULATOR CONTROLS USING DIVERSION SWITCHES, by H. S. Hoffman, Jr., *IBM Technical Disclosure Bulletin*, Vol. 21, No. 12, May 1979, pp. 4909–4910, shows two types of regulators for flyback power supplies. There is an overall loop regulator control for regulating one of the output voltages. The loop regulator consists of a pulse width modulator or a frequency controller that is responsive to the difference between the output voltage and a reference voltage. The pulse width or frequency control signal is applied to the switch in the primary circuit so that the first output voltage is maintained at the correct value.

The second output voltage regulator uses a diversion switch for control. In one circuit, the energy is diverted by a conduction-biased transistor to the other voltage output supply and in the other circuit, it is diverted to a short circuit path. By controlling the amount of flyback energy so diverted, the second output voltage is maintained at the desired value.

As will be seen when compared to the invention as described in detail below, the above references do not show, suggest, or teach the invention.

DISCLOSURE OF THE INVENTION

In accordance with the invention, a flyback power supply, which has a primary and a secondary circuit, where the current in the primary circuit induces a voltage in the secondary circuit, and which also has a switch in the primary circuit for controlling the current therein in response to a control signal that alternately opens and closes the switch, is equipped with a damping means in the secondary circuit that damps the oscillations therein while current is flowing in the primary circuit.

The damping of the oscillations in the secondary circuit reduces the oscillations reflected into the primary circuit during the charge cycle, i.e., while current is flowing in the primary. At a given point, the primary current is monotonically increasing, permitting and facilitating feedback control of the switch in the primary circuit.

DESCRIPTION OF THE PREFERRED EMBODIMENT

Figure 1:
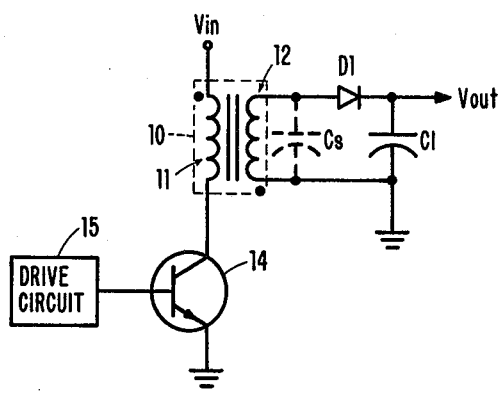
FIG. 1 is a schematic of a flyback type power supply.

The invention can be best understood by a consideration of the operation of the circuit shown in FIG. 1.

A flyback transformer 10 has a primary winding 11 and a secondary winding 12. The primary winding 11 is usually made up of a few turns of heavy wire for carrying a relatively heavy primary current at a low voltage. The secondary winding 12 is usually made up of a great many turns of small wire for producing a high voltage with a light current.

The current in the primary winding 11 is controlled by some switching device, illustrated in FIG. 1 as a switching transistor 14. A drive circuit 15 alternately turns the transistor 14 on and off. At t0, the transistor 14 is turned on but current can not flow instantaneously through an inductance, i.e., the primary winding. The ratio of the instantaneous voltage to the value of the inductance is the time rate of change of the current, that is, $di/dt = E/L$ where E is the instantaneous applied voltage and L is the inductance value. Letting L1 represent the inductance of the primary winding and Vin, the applied voltage, the instantaneous current through the primary at time t1 is given by $$i1(t1) = Vin\ t1/L1.$$

The current through the primary generates a magnetic field having a strength depending on the current and the number of turns in the winding of the primary. The magnetic field represents energy stored by the inductance and the amount of energy, U, is given by $$U = L1\ i1'2/2.$$

The voltage induced in the secondary winding by the increasing primary current reverse biases a diode D1 so that no current flows in the secondary during the charging cycle.

The time during which the transistor 14 is turned on is referred to as the charging cycle since it acts to increase the energy stored in the magnetic field. The time that the transistor 14 is turned off, i.e., from t1 to t0, is referred to as the discharge cycle.

At time t1, the transistor 14 is turned off by the drive circuit 15 and the magnetic field, having no primary current to sustain it, collapses rapidly because of the sharp cut-off by the transistor 14.

The collapsing lines of force cut the windings and transfer the energy in the field to the secondary circuit. Because of the orientation of the windings, as shown by the dots, the voltage induced in the secondary winding forward biases the diode D1. The resulting current charges the capacitor C1 and delivers a high output voltage to the load. The energy in the field at t1 is $$U(t1) = (Vin\ t1)'2/2L1.$$

Figure 2A:
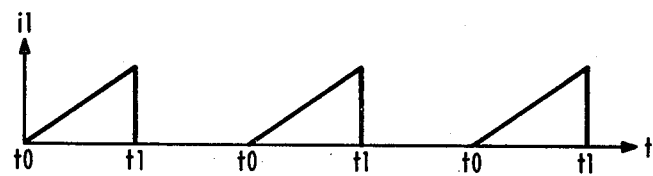
FIG. 2 is a triad of amplitude-versus-time graphs showing idealized waveforms in various parts of the circuit of FIG. 1.
Figure 2B:
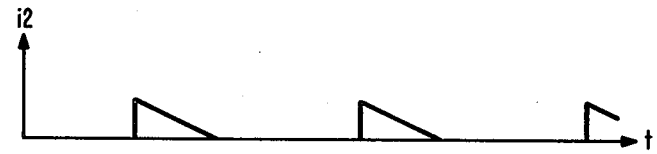
Figure 2C:

FIG. 2 is three graphs showing the ideal waveforms at various points in the circuit with respect to time. FIG. 2A represents the primary current, i1. It shows the linear increase of the current from the turn-on time of the transistor 14 at t0 to its turn-off time at t1. FIG. 2B represents the secondary current, i2. Because the diode D1 was reverse biased during the period from t0 to t1, there is no current flowing in the secondary. When the field collapses as a result of turning off the transistor 14 at time t1, the current is induced in the opposite direction so that the diode D1 is forward biased. FIG. 2C represents the voltage at the collector of the transistor 14. From t0 to t1, it is turned on and the Vce (collector-to-emitter voltage) is negligible. When the transistor 14 is turned off at t1, the voltage at the collector is the input voltage, Vin, plus the voltage induced in the primary winding by the collapsing magnetic field. The peak voltage, vp, is related to the output voltage, Vout by $$vp = Vin + Vout\ (L1/L2)'(1/2).$$

When the field has collapsed, the collector voltage, vc, of the transistor 14 is simply Vin.

The alternation of charge and discharge cycles is repeated as described above. The output voltage, Vout, is smoothed by the discharging of the capacitor C1 into the load during the charge cycle of the flyback circuit.

The above description was directed to the ideal operation of the flyback circuit and did not take into account the effects of stray (parasitic) capacitance, especially that in the secondary circuit. In FIG. 1, the stray capacitance is shown as Cs in the secondary circuit only, the stray capacitance of the primary being negligible in comparison.

During the charge cycle, the diode D1 is reverse biased as discussed above. The stray capacitance Cs and the inductance L2 of the secondary winding of the transformer 10 form a resonant tank circuit with a high quality factor (Q) because of the high impedance of the diode D1.

The quality factor of a circuit is two pi times the ratio of the maximum stored energy to the energy dissipated per cycle at a given frequency. The given frequency is usually the resonant frequency in the case of resonant circuits. The quality factor of a circuit can never be infinite because in practical circuits there is always some resistance that will dissipate energy.

The dissipation of the energy by a resistance causes the free oscillations in a resonant circuit to be damped.

Damping is the temporal decay of the amplitude of a free oscillation of a system, associated with energy loss from the system. It is conveniently approximated by a viscous damping coefficient in a second-order linear differential equation or by a quadratic factor in a transfer function. A circuit is called critically damped if its time response to an abrupt stimulus is as fast as possible without overshoot. It is overdamped or aperiodic if the response is slower than the critically damped case. It is underdamped or oscillatory if overshoot occurs. A resonant tank circuit such as that formed by L2 and Cs is underdamped because the resistance in the circuit is relatively high. The frequency of oscillation is $c(L2Cs)'(-\frac{1}{2})$ where c is equal to two pi.

Figure 3:
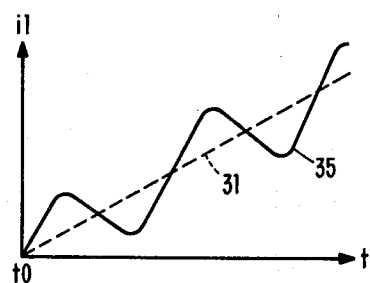
FIG. 3 is a graph of the primary charging current in the circuit of FIG. 1.

The resonance in the secondary circuit is reflected by induction into the primary circuit, causing a sinusoidal waveform to be superimposed on the charging current. FIG. 3 is an illustration of the actual current in the primary circuit caused by the reflected oscillation. Instead of being linear as shown by the line 31, the current is nonmonotonically increasing as shown by the line 35. In effect, the current is periodically surging through the primary circuit.

To understand the problem this reflected oscillation presents to the control of the flyback circuit, it will help to understand pulse width modulation regulation control. As noted above, the energy stored in the primary circuit and which is transferred to the secondary circuit is given by $$U(t1) = (Vin t1)'2/(2L1).$$

By controlling the amount of energy stored per cycle, the output voltage can be regulated. The three variables that determine the energy are seen to be the primary inductance, L1, the input voltage, Vin, and the time of transistor turn-off, t1 (which is actually the charging time). The primary inductance, L1, is fixed so that Vin and t1 are the only variables that can be controlled.

The control of Vin requires the addition of a series-pass device that will carry the full charging current. This reduces the reliability of the circuit because two full current carrying devices are then required. It also will cause additional dissipation in the primary circuit which represents a net energy loss in the system.

Therefore, the variable t1 is the remaining variable that can be controlled. A first order servo loop can be used to control t1. The output voltage is compared to a reference voltage and the difference value is used to control the timing of a one-shot multivibrator (for example) that turns on the primary transistor switch for a period of time that is determined by the output voltage. If the output voltage is lower than desired, the switch is turned on for a longer time to store more energy in the system. If the output voltage is higher than desired, the switch is turned on for a shorter time so that less energy is stored in the system. In the standard first-order servo loop, the gain of the flyback system, Gf, is defined as dVout/dT where T=t1−t0.

The problem of regulating the output voltage by controlling t1 when the primary current is nonmonotonically increasing is that the control of t1 is in effect the control of the maximum energy being delivered into the circuit. That, in turn, depends on the maximum current. Since the maximum current is not a linear function of t1 in the nonmonotonic case, the energy being delivered into the circuit is not accurately controlled by controlling t1.

Figure 4:
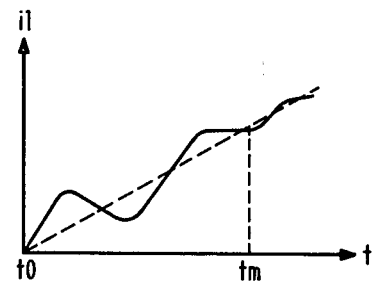
FIG. 4 is a graph of the primary charging current in the improved circuit shown in FIG. 5.

To make the control of the maximum energy delivered to the system per cycle more efficient and certain, the circuit is modified according to the invention to make the current in the primary circuit monotonically increasing after some given point in the charge cycle. A desired waveform is illustrated in FIG. 4. If the primary current is monotonically increasing after some time, tm, in the cycle, then control of the circuit by controlling t1, as long as t1 is greater than tm, will be more certain and efficient. If the primary current goes negative at any time during the charge time, the circuit will be inherently unstable at that operating point.

Figure 5:
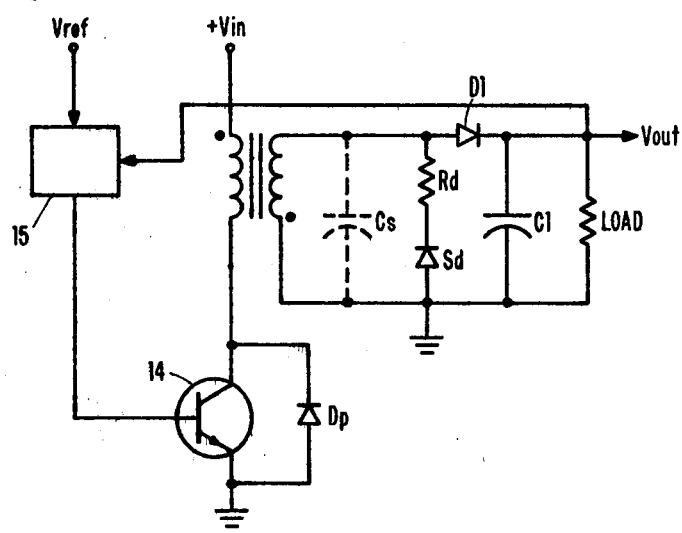
FIG. 5 is a schematic of a flyback power supply with a damping circuit according to the invention.

The waveform of FIG. 4 is achieved by damping the secondary oscillations during the charge cycle using a damper circuit as shown in FIG. 5. A damper resistance, Rd, is added to the secondary circuit to reduce its quality factor. To damp the secondary circuit during the charge cycle only, a diode Sd is added to cause the damper Rd to be effectively switched out of the circuit during the discharge cycle.

This connection differs from that of the television flyback supply which is damped only during the discharge cycle so as to create the proper horizontal sweep waveform.

The optimal value for the damping resistor Rd can be determined from the following considerations. The key to the analysis is to use a transformer T-model with a parallel resistor and capacitor combination across the secondary terminals. The capacitor value is determined from the secondary resonant frequency so that the value of the resistor determines the input admittance, $$Yin = (i1/Vin) = (1/(sL1(1-k'2)))N(s)/D(s)$$

where $N(s) = s'2 + s/RC + 1/L2C$, and
$D(s) = s'2 = s/RC + 1/(L2C(1-k'2))$.
Applying a step input voltage produces the following response in the primary current:

$$i1 = (Vin/L1)((k'2)L2/L1R + t - k'2/(w(1-k'2)) \cos(wt + Q) \exp(-t/RC))$$

where w is approximately $1/(L2C(1-k'2))$. The effect on the gain is determined by an analysis of the energy input to the primary, $$dU/dt(c) = v(t)i(t)$$

where t(c) is the charge time.
v(t) is the instantaneous input voltage, and
i(t) is the instantaneous input current. The output voltage is expressible as a function of the energy, $$Vo = f(U) \text{ so that } dVo/dU = f'(U),$$

the gain function being $$dVo/dt(c) = (dVo/dU)(dU/dt(c)) = v(t)i(t)f'(U).$$

With a resistive load (R1) and parasitic secondary capacitance, $$U = Vo'2 \, T/R1 + C \, Vo'2/2$$

with $$Vo'2 = U/(T/R1 + C/2)$$

and $dV_o/dt(c) = v(t)i(t)/(2(U(T/R1+C/2)'(\frac{1}{2})))$

Using commercially available CAD (computer-aided design) programs, the primary current waveform and gain functions with respect to time can be calculated. From these values the proper damping resistance can be calculated for acceptable closed loop response.

Figure 8:
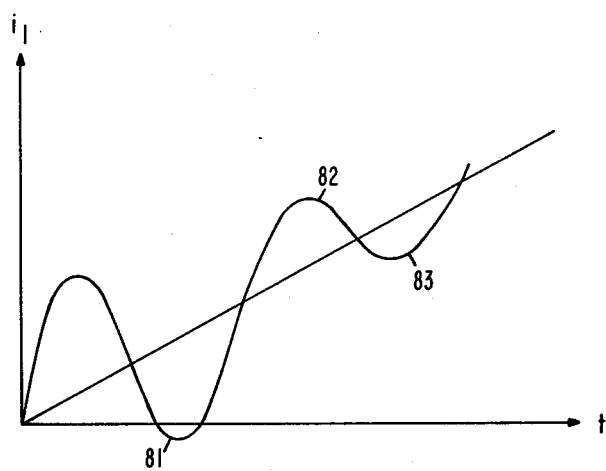
FIG. 8 is a plot of primary current versus time useful for determining the value of Rd.
Figure 9:
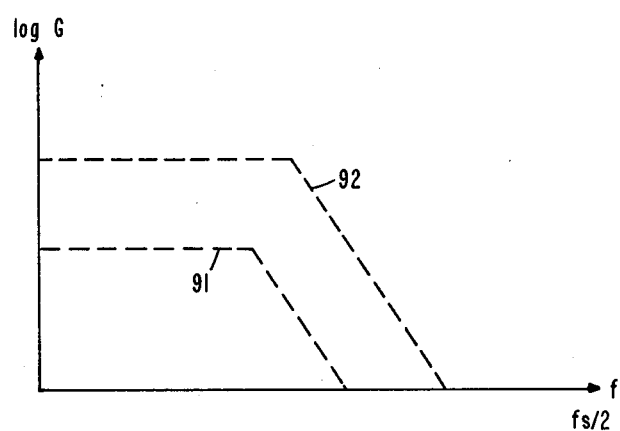
FIG. 9 is a Bode plot of the upper and lower closed loop gain limits useful for determining the value of Rd.

A guide to the proper response in terms of the primary current and gain are shown in FIGS. 8 and 9, respectively. In FIG. 8, the primary current is shown with a negative-going partial cycle 81. This represents an inherently unstable situation in a feedback loop. The maxima, such as the peak 82, and minima, such as the point 83, represent high and low gain points, respectively, in the system. The Bode plot of the high gain 92, determined by the maxima of the primary current, and the low gain 91, determined by the minima of the primary current, shows the limits within which the closed loop gain of the system must be constrained. For stability, the high gain limit 92 should be as close as possible to a value equal to half the switching frequency (fs/2) without equalling or exceeding it. If the gain rolloff extends beyond fs/2, the system becomes unstable. A margin for stability should be provided.

There is a limit on the low gain limit 91 that is not as critical but which, if the gain decreases below it, the system will not operate.

Therefore, by plotting the primary current and gain with various values of Rd, the optimal value of the damping resistance can be determined.

Figure 7:
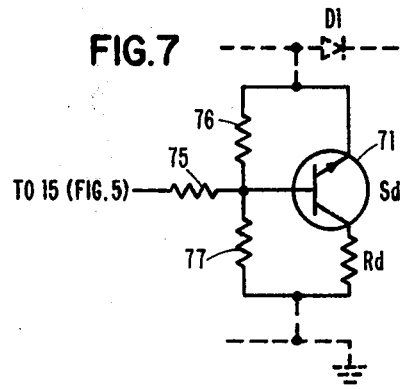
FIG. 7 is a schematic of an alternate implementation of the damping circuit of the invention.

FIG. 7 is an alternate damper circuit for insertion into the secondary circuit. A transistor 71 is used as the damper switch Sd and is controlled by a pulse width modulator 15 of FIG. 5. The resistors 75, 76, and 77 are used for biasing the transistor 71 and present a sufficiently high impedance to the secondary circuit so that their damping effect is negligible. When the transistor 14 of the circuit of FIG. 5 is turned on by the pulse width modulator 15, the damper switch Sd, i.e., the transistor 71, is also turned on so that the damping resistor, Rd, is switched into the secondary circuit.

Figure 6A:
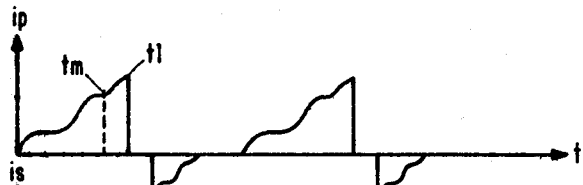
FIG. 6 is a triad of amplitude-versus-time graphs of the waveforms in various parts of the circuit of FIG. 5.
Figure 6B:
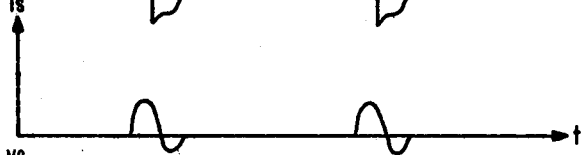
Figure 6C:
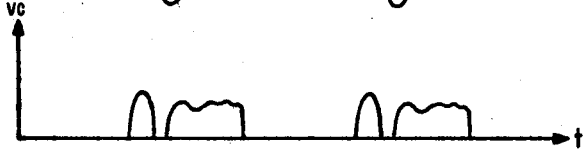

The waveforms in the circuit of FIG. 5 are shown in FIG. 6. The primary current waveform in FIG. 6A shows the relationship of t1 to tm. The other waveforms are self-explanatory.

The energy loss caused by the damper must be supplied by the charging cycle. The energy delivered to the circuit includes the load energy (for supplying Vout), the capacitance energy (to discharge the negative charge on Cs), and the damper energy (dissipated by Rd during the charge cycle). The extra energy represented by the latter is compensated for by the greater degree of regulation permitted.

The following summarizes the symbols used in the foregoing description:
c: two pi
Cs: stray (parasitic) capacitance, secondary circuit
Gf: gain of the flyback system (=dVout/dT)
i1: primary current
i2: secondary current
i1 (t1): instantaneous current at time t1
i(t): instantaneous value of the input (primary) current
k: coefficient of coupling between the primary and secondary windings
ln: natural logarithm
L1: primary inductance
L2: secondary inductance
Q: phase angle
Rd: damping resistance
R1: load resistance
Sd: damping switch
t0: time primary switch turned on
t1: time primary switch turned off
t(c): see T
tm: time after which the primary current is monotonically increasing
T: t1−t0, charge time
U: energy
vc: collector voltage
Vce: collector-to-emitter voltage
Vin: input voltage
vp: peak voltage
Vout: output voltage
v(t): instantaneous value of the input voltage
w: frequency in radians per second
': exponentiation (X-squared=X'2; square root of X=X'($\frac{1}{2}$))

Various modifications to the systems and circuits described and illustrated to explain the concepts and modes of practicing the invention can be made by those of ordinary skill in the art within the principles or scope of the invention as expressed in the attached claims.

What is claimed is:

1. In a power supply of the flyback type including transformer means having primary circuit means and secondary circuit means for inducing a voltage in said secondary circuit means in response to current action in said primary circuit means, switching means coupled to said primary circuit means for completing, when activated, a current path in said primary circuit means, and control means for alternately activating and deactivating said switching means, the improvement comprising:
   damping means coupled across said secondary circuit means for damping oscillations therein caused by stray capacitance while said switching means is activated.

2. The invention as claimed in claim 1 wherein said damping means comprises:
   impedance means for reducing the quality factor of said secondary circuit means; and
   means coupled to said impedance means for causing said impedance means to be effective only while said switching means is active.

3. The invention as claimed in claim 2 wherein said impedance means comprises a resistor.

4. The invention as claimed in claims 2 or 3 wherein said means coupled to said impedance means comprises a diode.

5. The inventions as claimed in claims 2 or 3 wherein said means coupled to said impedance means comprises a gating means responsive to said control means for causing said impedance means to be effective only when said switching means is activated.

6. The invention as claimed in claim 5 wherein said gating means comprises transistor means.

7. The combination comprising:
   resonant circuit means, in the secondary circuit of a flyback power supply, including stray capacitance, for storing energy;
   means for supplying current periodically to said resonant circuit means; and
   means operable during the supplying of current for reducing fluctuations in said current;
   whereby the energy stored in said resonant circuit can be closely controlled.

* * * * *

UNITED STATES PATENT AND TRADEMARK OFFICE
CERTIFICATE OF CORRECTION

PATENT NO. : 4,377,842
DATED : March 22, 1983
INVENTOR(S) : C. S. Cambier

It is certified that error appears in the above—identified patent and that said Letters Patent is hereby corrected as shown below:

Column 6, line 35, change "$D(s)=s'2=s/RC+1/(L2C(1-k'2))$" to --$D(s)=s'2+s/RC+1/(L2C(1-k'2))$--.

Column 6, line 53, change "$Vo=f(U)$ so that $dVo/dU=f(U)$" to --$Vo=f(U)$ so that $dVo/dU=f'(U)$--.

Column 6, line 57, change "$dVo/dt(c)=(dVo/dU)(dU/dt(c))=v(t)i(t)f(U)$" to --$dVo/dt(c)=(dVo/dU)(dU/dt(c))=v(t)i(t)f'(U)$--.

Signed and Sealed this

Seventeenth Day of January 1984

[SEAL]

Attest:

GERALD J. MOSSINGHOFF

Attesting Officer

Commissioner of Patents and Trademarks